(12) United States Patent
Wei et al.

(10) Patent No.: US 8,834,819 B2
(45) Date of Patent: Sep. 16, 2014

(54) POWDER LIME CALCINING PROCESS AND SYSTEM

(75) Inventors: Jun Wei, Shanghai (CN); Hua Gao, Shanghai (CN); Bin Zhang, Shanghai (CN); Guoqiang Liu, Shanghai (CN)

(73) Assignee: Baoshan Iron & Steel Co., Ltd., Shanghai (CN)

( * ) Notice: Subject to any disclaimer, the term of this patent is extended or adjusted under 35 U.S.C. 154(b) by 0 days.

(21) Appl. No.: 13/504,211

(22) PCT Filed: Oct. 13, 2010

(86) PCT No.: PCT/CN2010/077698
§ 371 (c)(1),
(2), (4) Date: Aug. 9, 2012

(87) PCT Pub. No.: WO2012/022067
PCT Pub. Date: Feb. 23, 2012

(65) Prior Publication Data
US 2013/0136674 A1 May 30, 2013

(30) Foreign Application Priority Data
Aug. 18, 2010 (CN) .......................... 2010 1 0256661

(51) Int. Cl.
C04B 2/10 (2006.01)
B01J 6/00 (2006.01)
F27D 13/00 (2006.01)
F27D 17/00 (2006.01)

(52) U.S. Cl.
CPC ............. *C04B 2/10* (2013.01); *F27D 2017/009* (2013.01); *C04B 2/106* (2013.01); *F27D 13/00* (2013.01); *F27D 17/008* (2013.01); *F27D 17/004* (2013.01)
USPC ........... 423/175; 423/637; 422/198; 422/232; 422/234

(58) Field of Classification Search
None
See application file for complete search history.

(56) References Cited

U.S. PATENT DOCUMENTS 4,118,177 A 10/1978 Weber et al.
4,169,701 A 10/1979 Katayama et al.
4,469,664 A * 9/1984 Abelitis et al. ........... 423/244.07

FOREIGN PATENT DOCUMENTS

| CN | 2403485 Y | 11/2000 |
| CN | 200958081 Y | 10/2007 |
| CN | 201346489 Y | 11/2009 |
| FR | 2584308 A1 * | 1/1987 |
| JP | 49-060327 | 6/1974 |
| JP | 53-088658 | 8/1978 |
| JP | 55-071651 | 5/1980 |

(Continued)

Primary Examiner — Jennifer A Leung
(74) Attorney, Agent, or Firm — Lihua Zheng; Joseph A. Capraro, Jr.; Proskauer Rose LLP

(57) ABSTRACT

A powder lime calcining process comprises: transporting fine granules of limestones having a water content less than 4%, and a granule size less than 15 mm, from a raw material storing bin to a small material bin, transporting the materials from the small material bin into an airflow pipe by a belt conveyer, heating and drying the materials, sieving the materials by a sieving device, transporting granules into a cyclone cylinder deduster and a clothbag deduster in turn by airflow pipes, the fine powders of limestones after dedusted are transported into an intermediate bin; the materials within the intermediate bin are transported to four preheating cyclone cylinders by a pneumatic lift pump and airflow pipes, and are preheated and separated; the materials after separated are transported into three cooling cyclone cylinders for cooling and separating the materials, finally transported into a finished product bin by a finished product transporting system.

23 Claims, 4 Drawing Sheets

(56) References Cited

FOREIGN PATENT DOCUMENTS

| | | |
|---|---|---|
| JP | 58-060646 | 4/1983 |
| JP | 59-076530 | 5/1984 |
| JP | 59-080427 | 5/1984 |
| JP | 07-89749 | 4/1995 |

* cited by examiner

POWDER LIME CALCINING PROCESS AND SYSTEM

CROSS-REFERENCE TO RELATED APPLICATIONS

This application is a National Phase Application of International Application No. PCT/CN2010/077698, filed on Oct. 13, 2010, which claims the benefit of and priority to Chinese patent application no. CN 201010256661.2, filed on Aug. 18, 2010. The disclosures of the above applications are incorporated herein by reference in their entirety.

TECHNICAL FIELD

The disclosure relates to a lime producing technology, and in particular, relates to a powder lime calcining process and system.

BACKGROUND ART

The current powder quicklime producing methods are breaking the calcined blocky quicklimes having a large granule size, that are, producing the blocky quicklimes having a large granule size by means of rotary kiln, sleeve kiln, or vertical kiln, then breaking and sieving them by means of various breaking equipments, so as to obtain powder quicklimes complying with subsequent process requirements. These powder quicklime producing methods have following shortcomings:

1. The producing equipments are not designed to exclusively aim at the powder quicklime, therefore, it needs a subsequent breaking process for supplement, causing a higher process energy consumption, and consuming the precious resources of blocky quicklimes;

2. The equipments such as rotary kiln, sleeve kiln, or vertical kiln can only use limestones having a large granule size as their raw materials, and are not able to accept limestones having a small granule size as their raw materials, however, a mass of limestones having a small granule size will be produced during mining, transporting and dressing, therefore, the resources of limestones cannot be effectively utilized.

A German company designed a device (suspension kiln) for directly calcining limestones having a small granule size as the raw materials so as to produce powder quicklimes complying with some requirements, however, due to its defects on system equipment integration, producing process control, etc., the production is not smoothly proceeded, and can not be a continuous massive production. There are mainly following problems on equipment integration: firstly, the main equipment "cyclone cylinder" has an obvious structural design defect on satisfying the continuity of the producing process; secondly, the capturing way for capturing fine powder materials having a high concentration within an air flow has a design defect; thirdly, the storage facility for the raw materials has a design defect; fourthly, the recovery for the return materials from the cyclone cylinder is not reasonably arranged; fifthly, the arrangement for the equipments at the product discharging port has a defect; sixthly, there is not any material (dust) recovering device in the workshop; seventhly, there is not any kiln encrustation breaking and recovering device in the workshop; eighthly, the equipments are not reasonably selected aiming at the movement characteristics of the powder materials; ninthly, the cooling for the products discharged from the kiln is not considered.

SUMMARY OF THE DISCLOSURE

An objective of the disclosure is to design a powder lime calcining process and system, wherein the powder lime calcining equipment has a reasonable matching, fine powder materials having a high concentration can be captured effectively, the storage facility for the raw materials has a reasonable design, the returning materials from the cyclone cylinder can be reasonably utilized, the whole system has a smooth material flow, finally the powder quicklime calcining equipment can meet the objective of producing qualified powder limes stably.

In order to meet the above objective, the technical solution of the present disclosure is that:

A powder lime calcining process comprises: transporting fine granules of limestones having a water content less than 4%, and a granule size less than 15 mm, from a raw material storing bin to a small material bin for temporary storage, transporting the materials in the small material bin into an airflow pipe by a belt conveyer, heating and drying the materials within in the pipe, by sieving the materials, coarser granules of the materials having a granule size more than 3 mm are transported into a breaking machine for breaking, finer granules having a granule size less than 3 mm are transported into a cyclone cylinder deduster and a clothbag deduster in turn by airflow pipes, the fine powders of limestones after dedusted, dried and broken are transported into an intermediate bin, the fine powders of limestones having a water content less than 1%, and a granule size less than 3 mm; the materials within the intermediate bin are transported to four preheating cyclone cylinders disposed from top to down by a pneumatic lift pump and airflow pipes, and are preheated and separated; the materials after separated are transported into three cooling cyclone cylinders for cooling and separating the materials, the materials discharged from the third cooling cyclone cylinder are transported into a finished product bin by a finished product transporting system, the finished product transporting pipe being provided with a cooling mechanism.

Furthermore, the materials within the small material bin are transported into a high temperature pipe between the breaking machine and the sieving device by a belt conveyer and an airflow pipe, the finer granules after sieved by the sieving device are directly transported to the airflow pipe for dedusting, the coarser granules are returned to the breaking machine for breaking, then transported into the sieving device.

The materials are heated and dried within the pipe using a high temperature airflow, which is heated by a heating burner of a calcining system, transported to the pipe by an airflow pipe, and has a temperature of 150–250° C.

Moreover, the four preheating cyclone cylinders are disposed from top to down, the materials are transported to the airflow pipe between the first and second preheating cyclone cylinders, then transported into the first preheating cyclone cylinder along the pipe airflow for separating and preheating; a small amount of returning materials are transported into a material collecting hopper on a bottom of a cooling tower, and into the finished product bin by the finished product transporting system; a majority of materials are transported into the airflow pipe between the third and second preheating cyclone cylinders, then transported into the second preheating cyclone cylinder along the pipe airflow for separating airs and materials, the materials discharged from the second preheating cyclone cylinder are transported into the airflow pipe between the third and fourth preheating cyclone cylinders, then transported into the third preheating cyclone cylinder along the pipe airflow for separating airs and materials; the materials discharged from the third preheating cyclone cylinder are decomposed by a high temperature calcining of a calcining system, then transported into the fourth preheating cyclone cylinder for separating airs and materials.

The three cooling cyclone cylinders are disposed from top to down, the materials are transported to the airflow pipe between the first and second cooling cyclone cylinders, then transported into the first cooling cyclone cylinder along the pipe airflow for cooling and separating; the materials after separated are transported into the airflow pipe between the second and third cooling cyclone cylinders, then transported into the second cooling cyclone cylinder along the pipe airflow for cooling and separating; the materials discharged from the second cooling cyclone cylinder are transported into the third cooling cyclone cylinder for cooling and separating; the materials discharged from the third cooling cyclone cylinder are transported into the finished product bin by the finished product transporting system.

A kiln encrustation breaking and recovering device is disposed near the preheating cyclone cylinders.

The cooling mechanism of the finished product transporting pipe is a water cooling mechanism.

Moreover, a finished product cooling bin is provided according to the present disclosure.

A powder lime calcining system according to the present disclosure comprises: a raw material storing bin, a small material bin connected to the raw material storing bin by a belt conveyer, a belt conveyer disposed beneath the small material bin, a breaking machine beneath the belt conveyer, a sieving device communicated with the breaking machine by a high temperature pipe, a cyclone cylinder deduster communicated with the sieving device by an airflow pipe, a clothbag deduster connected to a rising pipe of the cyclone cylinder deduster by a pipe, an intermediate bin connected to the clothbag deduster by a transporting device, another transporting device disposed at the material discharging port of the intermediate bin, four preheating cyclone cylinders connected to the intermediate bin by a pneumatic lift pump and airflow pipes, the four preheating cyclone cylinders disposed from top to down, three cooling cyclone cylinders disposed from top to down and beneath the fourth preheating cyclone cylinder, a finished product transporting system connected to the material discharging port of the third cooling cyclone cylinder by a transporting device; a finished product bin connected to the finished product transporting system by a pipe with a water cooling structure; a cooling tower connected to a rising pipe of the first preheating cyclone cylinder by an airflow pipe, and connected to the breaking machine with its output by an airflow pipe and a course fan; a main exhaust fan connected to the clothbag deduster by a pipe.

The transporting device comprises an elevator, a zipper conveyor, a belt conveyer, or a revolving valve.

A material recovering bin is provided beneath the pneumatic lift pump or the third cooling cyclone cylinder.

A secondary air pipe is connected to the airflow pipe between the material discharging port of the second cooling cyclone cylinder and the air intake port of the third cooling cyclone cylinder, and a laying off pipe for preventing the secondary air pipe from blocking up is disposed within the airflow pipe near the secondary air pipe.

A vibrating screen is disposed beneath the laying off pipe.

The raw material storing bin is provided with a lid.

The preheating cyclone cylinder comprises a straight section, a tapered section; refractory bricks are built on the inner walls of the straight section and the tapered section; an air intake port is provided on the upper part of the straight section, a material discharging port and a material discharging device are provided on the lower end of the tapered section; at least three manholes are provided on the outer arcuate surface of the straight section; at least two manholes are provided on the tapered section of the cyclone cylinder along a vertical direction.

A circular manhole is provided on the air intake port of the straight section of the cyclone cylinder, at a position so that the air intake port can be all cleaned when being cleaned.

The center of the lowest manhole of the tapered section of the cyclone cylinder is spaced 1.5~2 meters from the bottom of the tapered section, and the two manholes are spaced 2 meters from each other.

A manhole for maintaining is provided between the tapered section of the cyclone cylinder and the revolving valve.

A blocking-preventing air cannon, the muzzle of which is directed to the cavity of the cyclone cylinder, is provided on the lower part of the tapered section.

The muzzle of the blocking-preventing air cannon is spaced 1~2 meters from the bottom of the tapered section.

Several staying members are crosswise welded to the inner wall of the straight section of the cyclone cylinder, with a predetermined space, and when the refractory bricks are built, the staying members are embedded into the refractory bricks.

There are 3~5 staying members per square meter in the refractory bricks of the straight section.

Several annular metal collars are welded to the tapered section of the cyclone cylinder with a vertical space, and refractory materials are built on the collar, with the collar embedded in the refractory materials.

Two annular metal collars are spaced 1~1.5 meters from each other vertically.

Compressed air scavenging pipes are provided between the bottom of the tapered section of the cyclone cylinder and the material discharging device.

The compressed air scavenging pipes are spaced 200 mm~400 mm from each other.

In the powder lime calcining system according to the present disclosure, the flow direction of the airflow is: the atmosphere→the secondary air pipe→the third cooling cyclone cylinder→the second cooling cyclone cylinder→the first cooling cyclone cylinder→the calcining system→the first to fourth preheating cyclone cylinder→the pipe→the flue gas cooling tower→the course fan→the breaking machine→the finer granules classifying equipment→the cyclone cylinder for effectively capturing finer powder materials→the flue gas dedusting clothbag→the main exhaust fan→the atmosphere.

In this process, the airflow has following characteristics:

1. The air is a natural inflow through the negative pressure of the system, so that the equipment is simple and free of maintenance;

2. The powder materials move along with the airflow within the airflow pipe, so that the calcination and decomposition thereof is fast and furious.

In the powder lime calcining system according to the present disclosure,

The first flow direction of the materials is: the raw material bin→the belt conveyer→the small material bin→the weighting belt→the breaking machine→the sieving device→the cyclone cylinder for effectively capturing finer powder materials→the flue gas dedusting clothbag→the transporting device→the intermediate material bin. In this stage of material flow process, the finer granules of limestones having a water content less than 4%, and a granule size generally less than 15 mm become the finer powders of limestones which are dried (having a water content less than 1%), and have a further reduced granule size (the granule size of more than 90% finer powders is less than 3 mm), so that it meets the raw material requirement for calcination in the kiln. At the same time, aiming at the characteristic that the airflow contains finer powders of limestones having a high concentration, the method for capturing the finer powders is improved, wherein a set of cyclone cylinder dedusting equipments are added prior to the clothbag deduster, the filtration area of the clothbag deduster is adjusted reasonably according to the flow quantity and flow rate of the system.

The second flow direction of the materials is: the intermediate material bin→the transporting device→the pneumatic lift pump→the first to third preheating cyclone cylinder→the calcining system→the fourth preheating cyclone cylinder→the first cooling cyclone cylinder→the second cooling cyclone cylinder→the third cooling cyclone cylinder→the sieving device→the transporting device→the finished product bin→supplying the user. (after sieving, a small amount of coarser granules enter "the fourth flow direction of the materials").

This stage of material flow process is the key point of the whole process, wherein it achieves the chemical process for transforming limestones to quicklimes, meets the continuity of the producing process for the main equipment—cyclone cylinders, has significant improvements on the structures such as the choice of compressed air scavenging point, the choice of air cannon position, and the reasonable arrangement of cleaning manholes, greatly improves the continuity of the producing process, and has a very important function to stabilize the material flow of the system.

The third flow direction of the materials is: the returning materials from the fourth preheating cyclone cylinder→the airflow pipe→the flue gas cooling tower→the transporting device→the finished product bin→supplying the user. This stage of material flow process solves the problem of the egress of the returning materials from the fourth preheating cyclone cylinder, and basically solves the influence of the material recovery factor of the fourth preheating cyclone cylinder on the recovery factor of the whole system, and effectively ensures the input-output ratio of the whole system.

The fourth flow direction of the materials is: the outflowing materials, dusts and the like from the preheating cyclone cylinders and the cooling cyclone cylinders→the pipe→the recovery material bin→the transporting vehicle→another recovery device (outside of the system)→supplying the user. This stage of material flow process is provided based on the characteristic of the actual producing process, making the outflowing materials, dusts and the like have a recovery channel, and ensuring the favorable working place.

The fifth flow direction of the materials is: the outflowing kiln encrustations from the equipments (having an equivalent composition to the finished products)→breaking→sieving→finer powders entering the finished product bin for supplying the user, and a small amount of coarser granules entering "the fourth flow direction of the materials". This stage of material flow process is provided to solve the problem of the egress of the sintered kiln encrustations discharging from the system, wherein it achieves the recovery of the kiln encrustation by means of the combination of a small breaking machine and a sieving device, and also recovers the materials, ensures the favorable working place.

Compared to the prior art, the present disclosure has following advantages:

1. It does not use the calcined bulky quicklimes as raw materials, so that the precious bulky quicklimes can play a greater function.

2. Compared to the process of breaking the bulky quicklimes so as to obtain the powder quicklimes, the present disclosure has a lower unit energy consumption.

3. It greatly facilitates the effective utilization to the limestone resources, so that some finer granules of limestones produced during mining, transporting, and sieving can be sufficiently utilized.

Moreover, compared to the existing powder lime calcining system, the system according to the present disclosure can effectively, continuously and finely produce qualified powder quicklimes. It embodies in the following aspects:

1) The material flow of the whole system is arranged more reasonably, so that all the material flow is covered, various materials produced by the system have reasonable destinations, obtaining a better economical efficiency and a better environmental protection.

2) The technology for capturing finer powders of limestones having a high concentration is improved, wherein the added cyclone cylinder deduster greatly reduces the dust concentration of the airflow entering the clothbag, reduces the wear of the clothbag by the dust, and increases the useful life of the clothbag.

3) It improves the structure of the preheating cyclone cylinder, determines the structural design most favorable to the cyclone cylinder operation and the online cleaning, and greatly increases the working efficiency and working cycle of the cyclone cylinder.

4) On the design of raw material storing bin, it takes account of the bad influence of the water content of the raw materials on the system, mounting a water-preventing lid on the top of the raw material storing bin, greatly reducing the inrush of the rain water, greatly reducing the water content of the raw materials entering the system, so that the system heat can be dissipated less, and it is most important that the wear degree of the clothbag by the moist airflow can be improved greatly, bringing a favorable condition to increase the clothbag lifetime.

5) The choice of the power material transporting device has been improved greatly, not using the spiral reamer, but using the zipper conveyor or the elevator, its main reasons are that: firstly, the flow rate of the power material cannot be controlled easily; secondly, the spiral reamer is likely to overload due to the inflow of the large flow rate of powder material, but the zipper conveyor or the elevator has a larger space to accommodate the shock of the large flow rate of powder material.

6) The cooling to the finished product out of the kiln has been rearranged, wherein it adds a watercooling design for the finished product transporting pipe, and a secondary cooling material bin design, so that the temperature of the finished product out of the kiln can be reduced to a desired degree.

BRIEF DESCRIPTION OF THE DRAWINGS

The particular features and performances of the present disclosure are given by the following embodiments and figures.

BEST MODE FOR CARRYING OUT THE DISCLOSURE

Figure 1:
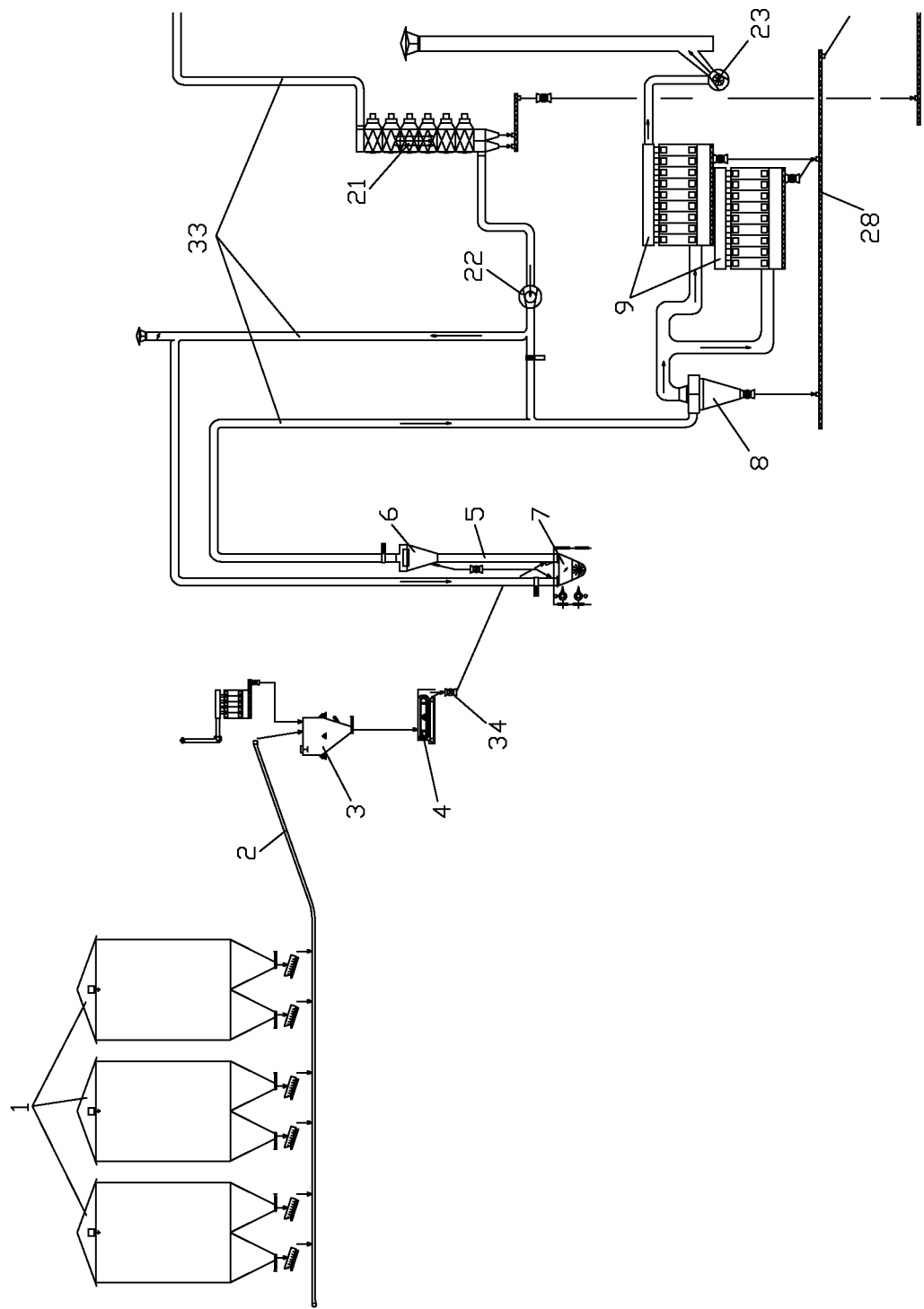
FIG. 1 and FIG. 2 are system diagrammatic views of a system according to an embodiment of the present disclosure.
Figure 2:
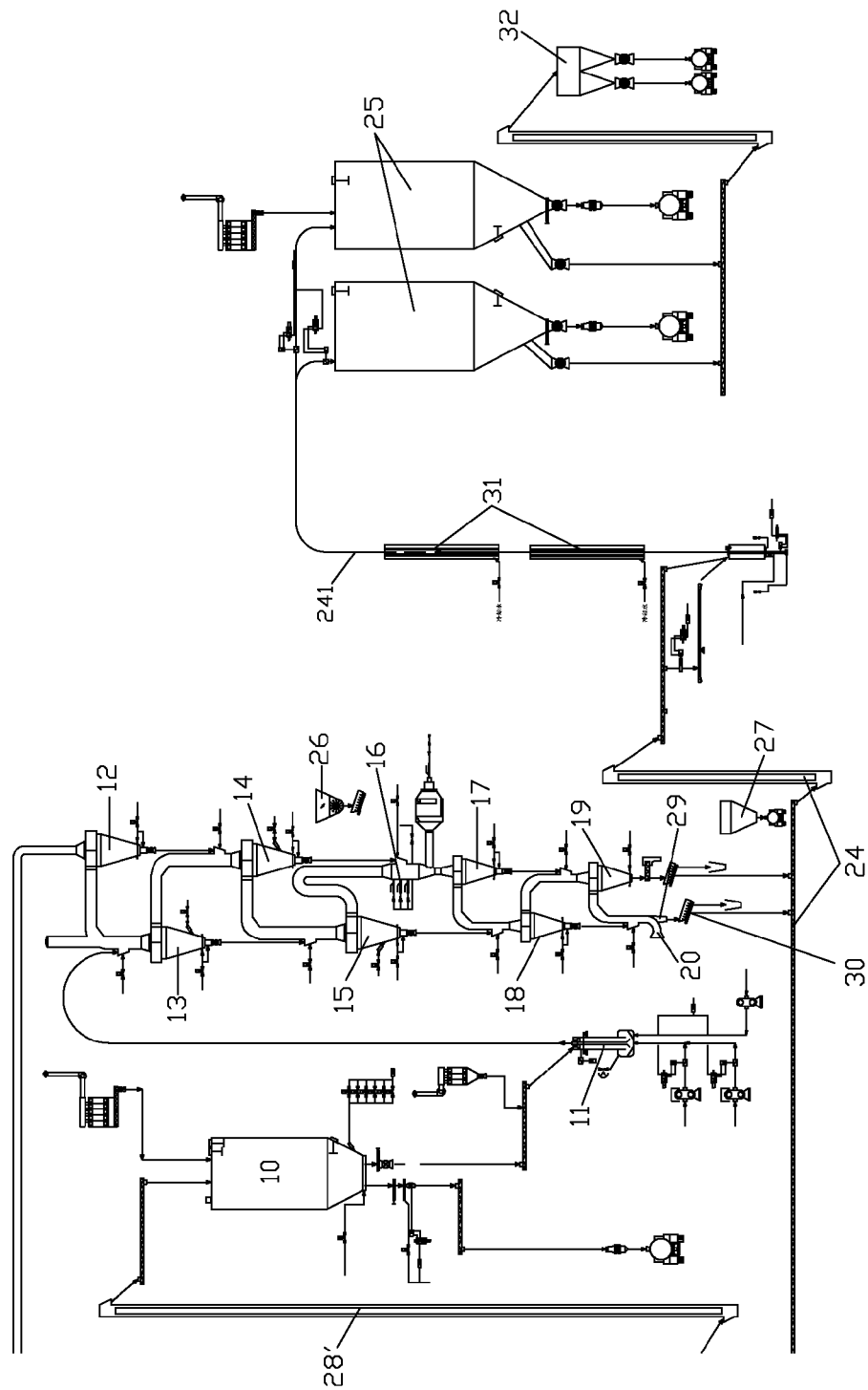
Figure 3:
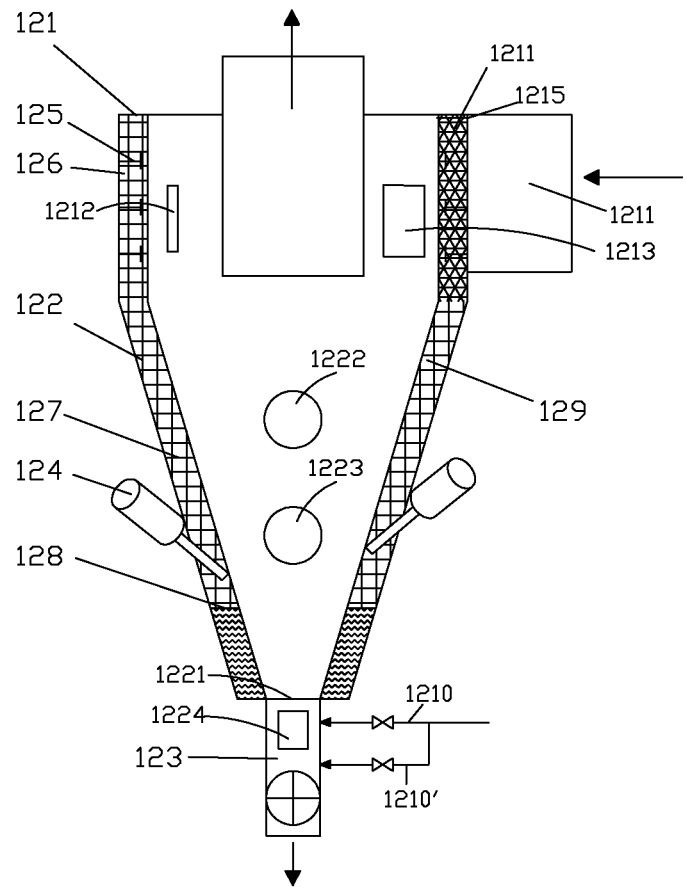
FIG. 3 is a structural diagrammatic view of a preheating cyclone cylinder according to an embodiment of the present disclosure.
Figure 4:
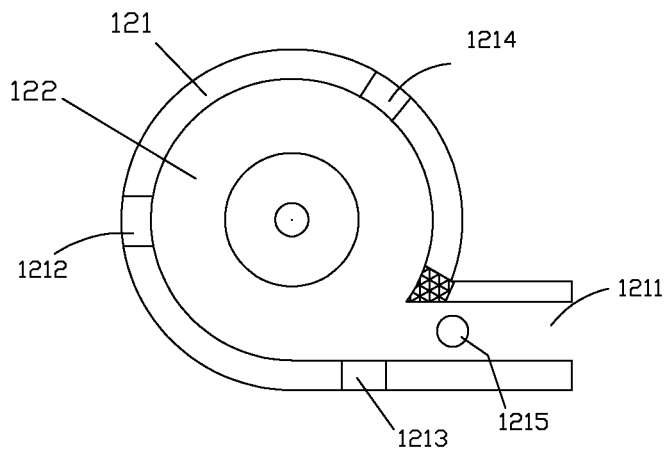
FIG. 4 is a top view of FIG. 3.
Figure 5:
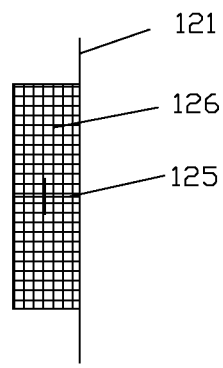
FIG. 5 is a top view of a staying member and refractory materials of the preheating cyclone cylinder according to the present disclosure.
Figure 6:
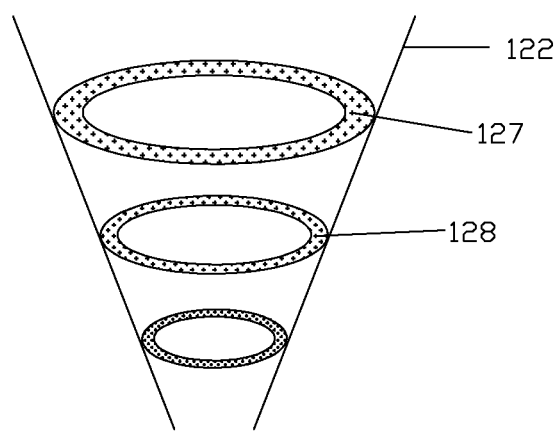
FIG. 6 is a diagrammatic view of annular metal collars in the preheating cyclone cylinder according to the present disclosure.

As shown in FIGS. 1 and 2, a powder lime calcining system according to the present disclosure comprises: a raw material storing bin 1, a small material bin 3 connected to the raw material storing bin 1 by a belt conveyer 2, a belt conveyer 4 disposed beneath the small material bin 3, a breaking machine 7 beneath the belt conveyer 4, a sieving device 6 communicated with the breaking machine 7 by a high temperature pipe 5, a cyclone cylinder deduster 8 communicated with the sieving device 6 by an airflow pipe 33, a clothbag deduster 9 connected to a rising pipe of the cyclone cylinder deduster 8 by a pipe, an intermediate bin 10 connected to the clothbag deduster 9 by a transporting device, another transporting device disposed at the material discharging port of the intermediate bin 10, four preheating cyclone cylinders 12, 13, 14, 15 connected to the intermediate bin 10 by a pneumatic lift pump 11 and airflow pipes, the four preheating cyclone cylinders disposed from top to down, three cooling cyclone cylinders 17, 18, 19 disposed from top to down and beneath the fourth preheating cyclone cylinder, a finished product bin 25 or a finished product cooling bin 32 connected to the material discharging port of the third cooling cyclone cylinder 19 by a finished product transporting system 24 and a pipe with a water cooling structure; a cooling tower 21 connected to a rising pipe of the first preheating cyclone cylinder 12 by an airflow pipe, and connected to the breaking machine 7 with its output by an airflow pipe and a course fan 22; a main exhaust fan 23 connected to the clothbag deduster 9 by a pipe.

Furthermore, the transporting device 28, 28' comprises an elevator, or a zipper conveyor.

A secondary air pipe 20 is connected to the airflow pipe between the material discharging port of the second cooling cyclone cylinder 18 and the air intake port of the third cooling cyclone cylinder 19. A laying off pipe 29 for preventing the secondary air pipe 20 from blocking up is disposed within the airflow pipe near the secondary air pipe 20. A vibrating screen 30 is disposed beneath the laying off pipe 29. The raw material storing bin 1 is provided with a lid. The finished product transporting pipe 241 is provided with a cooling mechanism 31 being a water cooling mechanism.

A kiln encrustation breaking and recovering device 26 is disposed near the preheating cyclone cylinders.

As shown in FIGS. 1 and 2, a powder lime calcining process according to the present invention comprises: transporting fine granules of limestones having a water content less than 4%, and a granule size less than 15 mm, from a raw material storing bin 1 to a small material bin 3 by a belt conveyer 2, transporting the materials from the small material bin 3 into an airflow pipe 33 by a belt conveyer 4 and a revolving valve 34, heating and drying the materials within a pipe 5, sieving the materials by a sieving device 6, wherein coarser granules having a granule size more than 3 mm are transported into a breaking machine 7, and into the sieving device 6 after broken; finer granules having a granule size less than 3 mm are transported into a cyclone cylinder deduster 8 and a clothbag deduster 9 in turn by airflow pipes, the fine powders of limestones after dedusted, dried and broken, which are adapted to be calcined in the kiln, are transported into an intermediate bin 10, the fine powders of limestones having a water content less than 1%, and a granule size less than 3 mm; the materials within the intermediate bin 10 are transported to four preheating cyclone cylinders 12, 13, 14, 15 disposed from top to down by a pneumatic lift pump and airflow pipes, and are preheated and separated;

The materials are heated and dried within the pipe 5 using a high temperature airflow, which is heated by a heating burner of a calcining system 16, transported to the pipe 5 by an airflow pipe, and has a temperature of 150~250° C.

The four preheating cyclone cylinders 12, 13, 14, 15 are disposed from top to down. The materials are transported to the airflow pipe between the first and second preheating cyclone cylinders 12, 13, then transported into the first preheating cyclone cylinder 12 along the pipe airflow for separating and preheating; a small amount of returning materials are transported into a material collecting hopper on a bottom of a cooling tower 21, and into a finished product bin 25 by a transporting equipment and a finished product transporting system 24; a majority of materials are transported into the airflow pipe between the third and second preheating cyclone cylinders 14, 13, then transported into the second preheating cyclone cylinder 13 along the pipe airflow for separating airs and materials, the materials discharged from the second preheating cyclone cylinder 13 are transported into the airflow pipe between the third and fourth preheating cyclone cylinders 14, 15, then transported into the third preheating cyclone cylinder 14 along the pipe airflow for separating airs and materials; the materials discharged from the third preheating cyclone cylinder 14 are decomposed by the high temperature calcining of the calcining system 16, then transported into the fourth preheating cyclone cylinder 15 for separating airs and materials.

The materials after separated are transported into three cooling cyclone cylinders 17, 18, 19 for cooling and separating the materials. The three cooling cyclone cylinders 17, 18, 19 are disposed from top to down. The materials are transported to the airflow pipe between the first and second cooling cyclone cylinders 17, 18, then transported into the first cooling cyclone cylinder 17 along the pipe airflow for cooling and separating; the materials after separated are transported into the airflow pipe between the second and third cooling cyclone cylinders 18, 19, then transported into the second cooling cyclone cylinder 18 along the pipe airflow for cooling and separating; the materials discharged from the second cooling cyclone cylinder 18 are transported into the third cooling cyclone cylinder 19 for cooling and separating; the materials discharged from the third cooling cyclone cylinder 19 are transported into the finished product bin 25 by the finished product transporting system 24. The finished product transporting pipe 241 is provided with a cooling mechanism 31.

As shown in FIGS. 3~6, the preheating cyclone cylinder according to the present disclosure (for example, the preheating cyclone cylinder 12) comprises a straight section 121, a tapered section 122; refractory bricks are built on the inner walls of the straight section 121 and the tapered section 122; an air intake port 1211 is provided on the upper part of the straight section 121, a material discharging port 1221 and a material discharging device 123 are provided on the lower end of the tapered section 122; three manholes 1212~1214 are provided on the outer arcuate surface of the straight section 121; two manholes 1222, 1223 are provided on the tapered section 122 of the cyclone cylinder along a vertical direction.

A circular manhole 1215 is provided on the air intake port 1211 of the straight section of the cyclone cylinder, at a position so that the air intake port can be all cleaned when being cleaned.

The center of the lowest manhole 1223 of the tapered section 122 of the cyclone cylinder is spaced 1.5~2 meters from the bottom of the tapered section. The two manholes 1222, 1223 are spaced 2 meters from each other. A manhole 1224 for maintaining and material discharging is provided between the tapered section 122 of the cyclone cylinder and the revolving valve.

A blocking-preventing air cannon 124, the muzzle of which is directed to the cavity of the cyclone cylinder, is provided on the lower part of the tapered section 122, and the muzzle of the blocking-preventing air cannon 124 is spaced 1~2 meters from the bottom of the tapered section.

Several staying members 125 are crosswise welded to the inner wall of the straight section 121 of the cyclone cylinder, with a predetermined space. When the refractory bricks are built, the staying members 125 are embedded into the refractory bricks 126. There are 3~5 staying members per square meter in the refractory bricks of the straight section.

Two annular metal collars 127, 128 are welded to the tapered section 122 of the cyclone cylinder with a vertical space. Refractory materials 129 are built on the collar, with the collar embedded in the refractory materials. The two collars 127, 128 are spaced 1~1.5 meters from each other vertically.

Compressed air scavenging pipes 1210, 1210' are provided between the bottom of the tapered section 122 of the cyclone cylinder and the material discharging device 123. The compressed air scavenging pipes 1210, 1210' are spaced 200 mm~400 mm from each other.

The invention claimed is:

1. A powder lime calcining process comprising:
   transporting fine granules of limestone having a water content less than 4%, and a granule size less than 15 mm, from a raw material storing bin to a small material bin, wherein the small material bin is connected to the raw material storing bin by a first belt conveyer;
   transporting the limestone from the small material bin into a high temperature pipe between a breaking machine and a sieving device by a second belt conveyer and an airflow pipe, wherein the second belt conveyer is disposed beneath the small material bin and the breaking machine is disposed beneath the second belt conveyer;
   heating and drying the limestone within the high temperature pipe;
   sieving the limestone in the sieving device to obtain coarser granules having a granule size more than 3 mm and finer granules having a granule size less than 3 mm, wherein the coarser granules are transported into the breaking machine for breaking, and the finer granules are transported by an airflow pipe into a cyclone cylinder deduster that is communicated with the sieving device by the airflow pipe, and then into a clothbag deduster that is connected to a rising pipe of the cyclone cylinder deduster by a first pipe;
   transporting the finer granules of limestone into an intermediate bin that is connected to the clothbag deduster by a transporting device, wherein the finer granules of limestone have a water content less than 1%, and a granule size less than 3 mm, and are adapted for calcining in a calcining system, and wherein a main exhaust fan is connected to the clothbag deduster by a third pipe;
   transporting the finer granules of limestone within the intermediate bin to four preheating cyclone cylinders disposed from top to down by a pneumatic lift pump and airflow pipes for preheating and air-material separation, wherein a second transporting device is disposed at a first material discharging port of the intermediate bin;
   transporting the separated materials into three cooling cyclone cylinders for cooling and air-material separation, wherein the three cooling cyclone cylinders are disposed from top to down and beneath the fourth preheating cyclone cylinder;
   transporting the materials discharged from the third cooling cyclone cylinder into a finished product bin that is connected to a finished product transporting system by a second pipe with a water cooling structure, wherein the finished product transporting system is connected to a second material discharging port of the third cooling cyclone cylinder by a third transporting device; and
   transporting air through a second rising pipe of the first preheating cyclone cylinder to a cooling tower by a second airflow pipe, wherein the output from the cooling tower is further connected to the breaking machine by a third airflow pipe and a course fan.

2. The powder lime calcining process according to claim 1, wherein the materials are first transported to the airflow pipe between the first and second preheating cyclone cylinders, then transported into the first preheating cyclone cylinder along the airflow pipe for air-material separation and preheating, wherein a small amount of returning materials are transported into a material collecting hopper on a bottom of the cooling tower, and into the finished product bin by the finished product transporting system, and the majority of materials are transported into the airflow pipe between the third and second preheating cyclone cylinders, then transported along the airflow pipe into the second preheating cyclone cylinder for air-material separation, the materials discharged from the second preheating cyclone cylinder are transported into the airflow pipe between the third and fourth preheating cyclone cylinders, then transported along the airflow pipe into the third preheating cyclone cylinder for air-material separation; and the materials discharged from the third preheating cyclone cylinder are decomposed by a high temperature calcining of the calcining system, then transported into the fourth preheating cyclone cylinder for air-material separation.

3. The powder lime calcining process according to claim 1, wherein the materials are transported to the airflow pipe between the first and second cooling cyclone cylinders, then transported into the first cooling cyclone cylinder along the airflow pipe for cooling and air-material separation; the materials after separation are transported into the airflow pipe between the second and third cooling cyclone cylinders, then transported into the second cooling cyclone cylinder along the airflow pipe for cooling and air-material separation; the materials discharged from the second cooling cyclone cylinder are transported into the third cooling cyclone cylinder for cooling and air-material separation; and the materials discharged from the third cooling cyclone cylinder are transported into the finished product bin by the finished product transporting system.

4. The powder lime calcining process according to claim 1, wherein the limestone is heated and dried within the high temperature pipe using a high temperature airflow, which is heated by a heating burner of the calcining system, transported to the high temperature pipe by an airflow pipe, and has a temperature of 150-250° C.

5. The powder lime calcining process according to claim 1, wherein a kiln encrustation breaking and recovering device is disposed near the preheating cyclone cylinders.

6. A powder lime calcining system comprising:
   a raw material storing bin,
   a small material bin connected to the raw material storing bin by a first belt conveyer,
   a second belt conveyer disposed beneath the small material bin, a breaking machine beneath the second belt conveyer,
a sieving device communicated with the breaking machine by a high temperature pipe,
a cyclone cylinder deduster communicated with the sieving device by an airflow pipe,
a clothbag deduster connected to a rising pipe of the cyclone cylinder deduster by a first pipe,
an intermediate bin connected to the clothbag deduster by a transporting device,
a second transporting device disposed at a first material discharging port of the intermediate bin,
four preheating cyclone cylinders connected to the intermediate bin by a pneumatic lift pump and airflow pipes, the four preheating cyclone cylinders being disposed from top to down,
three cooling cyclone cylinders disposed from top to down and beneath the fourth preheating cyclone cylinder,
a finished product transporting system connected to a second material discharging port of the third cooling cyclone cylinder by a third transporting device;
a finished product bin connected to the finished product transporting system by a second pipe with a water cooling structure;
a cooling tower connected to a second rising pipe of the first preheating cyclone cylinder by a second airflow pipe, and connected to the breaking machine with its output by a third airflow pipe and a course fan;
a main exhaust fan connected to the clothbag deduster by a third pipe.

7. The powder lime calcining system according to claim 6, wherein the second transporting device comprises an elevator, a zipper conveyor, a belt conveyer, or a revolving valve.

8. The powder lime calcining system according to claim 6, wherein a material recovering bin is provided beneath the pneumatic lift pump or the third cooling cyclone cylinder.

9. The powder lime calcining system according to claim 6, wherein a secondary air pipe is connected to a fourth airflow pipe between a third material discharging port of the second cooling cyclone cylinder and an air intake port of the third cooling cyclone cylinder, and a laying off pipe for preventing the secondary air pipe from blocking up is disposed within the fourth airflow pipe near the secondary air pipe.

10. The powder lime calcining system according to claim 9, wherein a vibrating screen is disposed beneath the laying off pipe.

11. The powder lime calcining system according to claim 6, wherein the raw material storing bin is provided with a lid.

12. The powder lime calcining system according to claim 6, wherein the preheating cyclone cylinders comprise a straight section, a tapered section; refractory bricks are built on the inner walls of the straight section and the tapered section; an air intake port is provided on the upper part of the straight section, a third material discharging port and a material discharging device are provided on the lower end of the tapered section; at least three manholes are provided on circumference of the outer arcuate surface of the straight section; at least two manholes are provided on the tapered section of the cyclone cylinders along a vertical direction.

13. The powder lime calcining system according to claim 12, wherein a circular manhole is provided on the air intake port of the straight section of the cyclone cylinders at a position so that the air intake port can be cleaned.

14. The powder lime calcining system according to claim 12, wherein the center of the lowest manhole of the tapered section of the cyclone cylinders are spaced 1.5~2 meters from the bottom of the tapered section, and the two manholes are spaced 2 meters from each other.

15. The powder lime calcining system according to claim 12, wherein a manhole for allowing maintenance is provided between the tapered section of the cyclone cylinders and a revolving valve.

16. The powder lime calcining system according to claim 12, wherein a blocking-preventing air cannon, the muzzle of which is directed to the cavity of the cyclone cylinders, is provided on the lower part of the tapered section.

17. The powder lime calcining system according to claim 16, wherein the muzzle of the blocking-preventing air cannon is spaced 1~2 meters from the bottom of the tapered section.

18. The powder lime calcining system according to claim 12, wherein several staying members are crosswise welded to the inner wall of body of the straight section of the cyclone cylinders, with a predetermined space, and when the refractory bricks are built, the staying members are embedded into the refractory bricks.

19. The powder lime calcining system according to claim 12, wherein there are 3~5 staying members per square meter in the refractory bricks of the straight section.

20. The powder lime calcining system according to claim 12, wherein several annular metal collars are welded to the tapered section of the cyclone cylinders with a vertical space, and refractory materials are built on the collar, with the collar embedded in the refractory materials.

21. The powder lime calcining system according to claim 20, wherein two annular metal collars are spaced 1~1.5 meters from each other vertically.

22. The powder lime calcining system according to claim 12, wherein compressed air scavenging pipes are provided between the bottom of the tapered section of the cyclone cylinders and the material discharging device.

23. The powder lime calcining system according to claim 22, wherein the compressed air scavenging pipes are spaced 200mm~400mm from each other.

* * * * *